(12) United States Patent
Wolf et al.

(10) Patent No.: US 6,394,434 B2
(45) Date of Patent: *May 28, 2002

(54) FASTENING SUPPORT

(75) Inventors: Franz Josef Wolf, Bad Soden-Salmunster (DE); Laszlo Bezi; Ferenc Schmidt, both of Budapest (HU); Alfred Kluh, Schluchtern (DE)

(73) Assignee: Woco Franz-Josef Wolf & Company, Bad Soden-Salmunster (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,352

(22) PCT Filed: Jun. 17, 1998

(86) PCT No.: PCT/DE98/01637

§ 371 (c)(1),
(2), (4) Date: Dec. 15, 1999

(87) PCT Pub. No.: WO98/58190

PCT Pub. Date: Dec. 23, 1998

(30) Foreign Application Priority Data

Jun. 17, 1997 (DE) ..................................... 297 10 578 U

(51) Int. Cl.$^7$ ................................................. F16F 7/00
(52) U.S. Cl. ........................................ 267/141; 267/293
(58) Field of Search .............................. 267/141, 141.1, 267/141.2, 141.3, 141.4, 141.5, 141.7, 292, 293, 294, 153, 152; 248/609, 635, 611, 638

(56) References Cited

U.S. PATENT DOCUMENTS

| | | | |
|---|---|---|---|
| 107,036 A | * 9/1870 | Gardiner | ..................... 267/141 |
| 3,350,042 A | * 10/1967 | Stewart et al. | ........... 267/141.4 |
| 3,675,881 A | * 7/1972 | Caldwell | ..................... 267/153 |
| 3,756,551 A | 9/1973 | Bishop | ..................... 267/141.1 |
| 3,895,408 A | * 7/1975 | Leingang | ..................... 267/153 |
| 4,521,004 A | * 6/1985 | Caldwell | ................. 267/141.4 |
| 4,522,378 A | * 6/1985 | Nelson | ......................... 267/153 |
| 4,530,491 A | 7/1985 | Bucksbee et al. | ........... 267/141 |
| 5,058,867 A | * 10/1991 | Hadano et al. | ........... 267/141.3 |
| 5,277,554 A | * 1/1994 | Elson | ......................... 248/638 |
| 5,405,118 A | * 4/1995 | Dietz et al. | ............... 267/141.4 |
| 5,456,454 A | * 10/1995 | Schulz et al. | ................ 267/293 |
| 5,580,028 A | 12/1996 | Tomczak et al. | |
| 5,601,304 A | 2/1997 | Tilly et al. | ............. 280/124.15 |
| 5,651,535 A | * 7/1997 | David | ......................... 267/153 |
| 5,743,509 A | 4/1998 | Kanda et al. | ............. 267/141.2 |
| 5,842,677 A | * 12/1998 | Sweeney et al. | ............. 267/293 |
| 5,975,505 A | * 11/1999 | Yoshimoto et al. | ......... 267/293 |
| 6,098,949 A | * 8/2000 | Robinson | .................. 267/141.2 |

FOREIGN PATENT DOCUMENTS

| | | | |
|---|---|---|---|
| DE | 18 00 990 | 10/1959 | |
| JP | 61-45124 A | * 3/1986 | .................. 267/141 |
| JP | 61-218844 A | * 9/1986 | .................. 267/292 |
| WO | 98 13623 | 4/1998 | |

* cited by examiner

Primary Examiner—Christopher P. Schwartz
Assistant Examiner—Thomas Williams
(74) Attorney, Agent, or Firm—Lowe Hauptman Gilman & Berner, LLP

(57) ABSTRACT

The invention relates to a fastening support of which a solid spring, in particular an elastomer spring, is hooked into an annular flange and rests on the edge surfaces of this flange, whereas at least one, mostly two end faces of the spring will be connected to the second connection fitting(s). In general these connection fitting act as load fittingss, whereas the hookup flange serves as a support fitting. The invention improves the service life of these economical fastening supports by means of a configuration such that the radial force-transmitting surfaces, that is those surfaces through which the load and support force are introduced into the spring, are configured in extensively congruent manner coaxially and in coaxial projection.

12 Claims, 2 Drawing Sheets

FASTENING SUPPORT

The invention relates to a fastening support.

Fastening supports of this kind are used to support machinery of the most diverse kind, and in particular, as regards automotive engineering, to support the power units.

Contrary to the case of a more complex support or bearing composed of several parts and equipped with a bearing spring usually of annular shape and of an intermediate support coupled to a separate shock absorber, a fastening support typically consists of an elastomer spring which herein preferably shall be integral and of two connection fittings, namely a first connection fitting acting as a support connection fitting and a second connection fitting acting as a load connection fitting to connect to the load. In general the elastomer spring is in the form of a body of rotation with its end faces in the radial plane. An annular channel is present approximately centrally between the two end faces and, following affixation of the elastomer spring in a hookup aperture present in the first connection fitting, it will be entered snugly, and optionally with slight prestressing, by the inside edge of the affixation aperture of the connection fitting. In general the spring comprises a continuous central borehole which in turn is fitted with a central sleeve passing a screw bolt. The sleeve is axially shorter than the relaxed spring, whereas the screw bolt is longer than the sleeve and furthermore may already project out of the relaxed spring. Load-receiving elements, foremost steel disks, are mounted on at least one, as a rule on the two mutually opposite end faces of the elastomer spring. The elastomer may be firmly connected in the manner of a rubber-metal compound to the connection fittings and also the connection fittings may be guided through the central screw bolt to loosely rest on the end faces of the elastomer spring. By screwing nuts on one or both sides of the screw bolt, the end-face connection fittings can be firmly pressed against the end-face edge of the central sleeve. As a result the elastomer spring of the fastening support will be prestressed. The particular degree of prestressing can be arbitrarily preselected as a function of the axial length of the sleeve. At the affixation side, the known, state-of-the-art elastomer spring used in the fastening supports and discussed here is configured in such manner that the elastomer spring can be "forced-through" the aperture of the first connection fitting which usually is designed as a rest, tang or flange, with minimal deformation and stressing of this elastomer spring. For that purpose the elastomer spring is hooked up.

Figure 1:
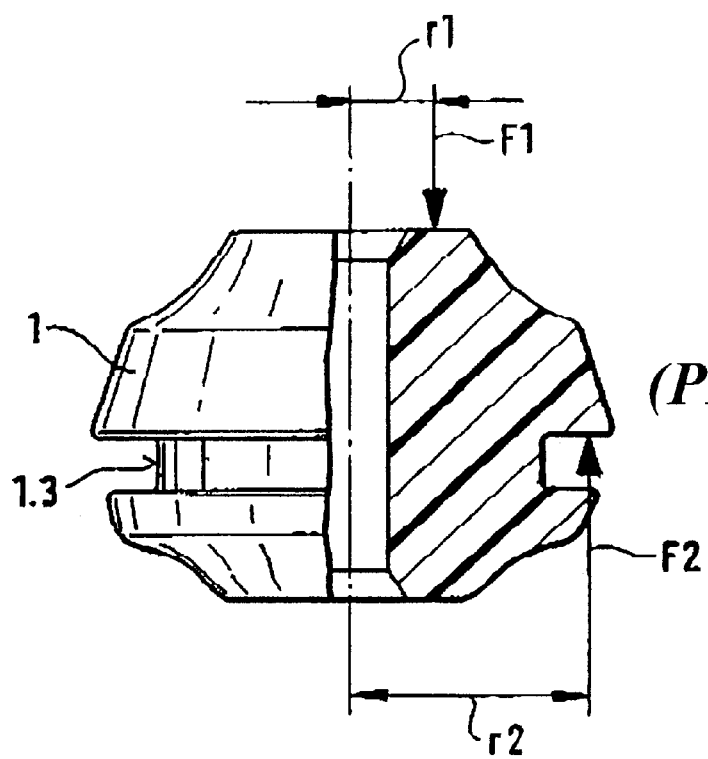
Figure 2:
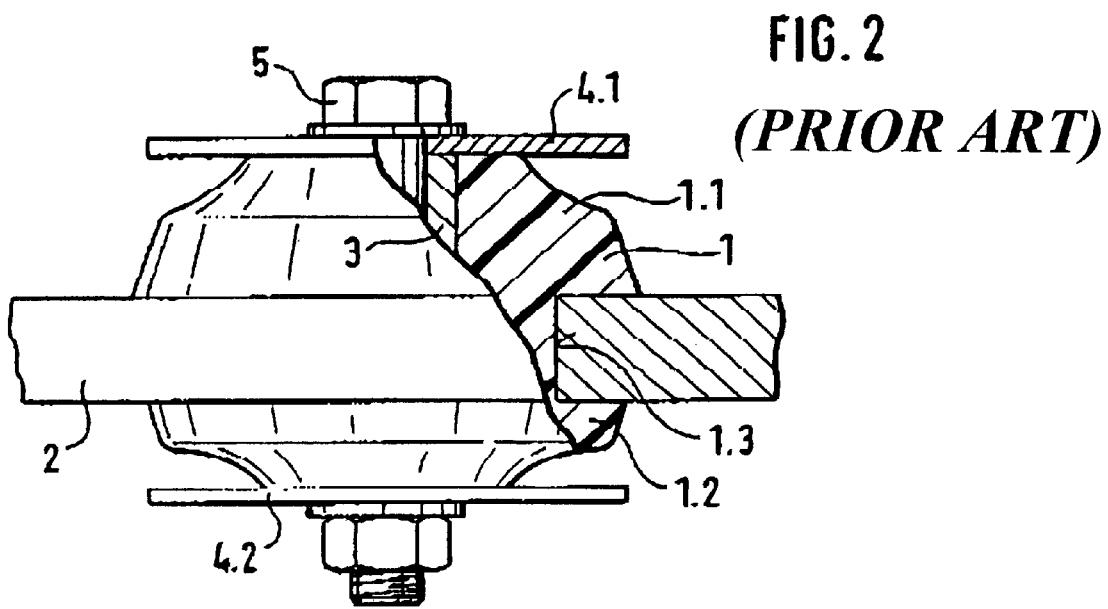

Such a presently conventional elastomer spring is shown in FIG. 1, FIG. 2 showing this spring assembled to a fastening support and in its prestressed but unloaded state. The references 1 denote the elastomer spring, 1.1 the segment of this spring acting as a shock absorber when compressed against the connection fitting 4.1, whereas, in the case of tension—after shunting the applied force through the sleeve 3—the opposite connection fitting 4.2 on the other end face of the elastomer spring, the also compressed part 1.2 of the elastomer spring 1 being buffers to absorb the applied tension, and, in this example of the state of the art, the connection fitting 2, act as supports for the compressive and thrust forces applied to the elastomer spring. Furthermore radial guidance is implemented in the known fastening support by means of the approximately cylindrical elastomer segment 1.3 between the central sleeve 3 and the edge of the aperture in the connection fitting 2.

The drawback of the above described embodiment of a fastening support known already for many decades in innumerable variations is that the geometry of the elastomer spring is predicated on favorable fastening conditions and optimal elastomer protection during affixation. However such a geometry is a tradeoff against the service life of such typically dynamically loaded fastening supports because the forces introduced through the connection fittings 4.1 and 4.2 on one hand and through the connection fitting 2 acting as a support on the other hand, into the elastomer spring, will be applied at unequal radii. As a result considerable shearing forces are generated in the buffer segments 1.1 and 1.2 of the elastomer spring, entailing a degradation in the life of the bearings. It is known that buffers subjected solely to compression will allow higher loading, sometimes by an order of magnitude, than an identical elastomer spring undergoing thrust or shear stresses. In practice the solution to this conundrum to-date has been to use rubber grades offering excellent strengths. Recently however, and in particular as regards power-unit bearing in the automotive industry in the form of fastening supports of the kind being discussed herein, ever higher thermal resistance has been demanded, for which, while the elastomer grades indeed are available, on the other hand they permit only reduced dynamical loading relative to the previously used elastomer grades for fastening supports. Vice-versa, the rubber grades used heretofore lack the thermal resistance required by the automotive manufacturers.

Based on this state of the art, the objective of the invention is to so improve a fastening support of the initially described species that the elastomer spring offers longer service life, especially under dynamical loading, whereby dynamical-loading also will allow such service lives, with elastomer grades of lower strengths but higher thermal resistances, that correspond to the previously feasible service lives or are even superior to them.

The basic concept of the invention allowing the desired improvements therefore is to stress easy hookup of the elastomer spring into the connection fitting eye when configuring an integral elastomer spring for a fastening support, furthermore to pay equal attention in the geometric design of the elastomer spring to control beforehand the occurrence of the various stresses and to change them in order that foremost practically no shear stresses and hardly any thrust stresses shall arise in the elastomer spring. It is possible thereby to improve the service lives of the fastening supports of the invention under steady-state dynamic loading by a factor of 10 to 20 over the state of the art shown in FIGS. 1 and 2 while using identical elastomer mixtures. This feature in turn allows—where required by the particular application(s)—to use elastomers, for instance EPDM which are mechanically more susceptible than many other elastomer mixtures but on the other hand are substantially more heat-resistant. Therefore the invention also allows manufacturing fastening supports having at least equal dynamic service lives and being optionally improved ones, that will concurrently withstand substantially higher operational temperatures. This feature is advantageous in automotive production, especially as regards motor vehicles, where fastening supports frequently are used as bearings for the drive units and where the higher performance requirements set on engines entailed steadily rising operational temperatures in recent years.

The basic concept to practically implement these insights assumes that the force-transmitting surfaces introducing loading and reaction forces into the elastomer spring must be set at equal radii relative to the direction of the load vector oriented axially parallel to the axis of rotation of the elastomer spring. This design is implemented primarily by a corresponding geometry of the elastomer spring and in subsidiary manner by a matching configuration of the hookup aperture.

Compared with the initially cited state of the art, this circumstance leads to the discovery that the radii of force introduction of the end-face circular force-flow surfaces of the integral elastomer fastening bodies must be enlarged and that the radii of force introduction of the flange-side rest surfaces must be decreased, and that simultaneously the effective areas of the force introducing surfaces, especially of the rest surfaces, be enlarged.

Especially good global-behavior bearing characteristics will be achieved when the axial bearing function and the radial stabilization of the bearing are transferred to mutually decoupled zones of the bearing's elastomer spring. In a preferred embodiment of the invention, this feature is attained in that the radially inward zone and the cylindrical zone of the elastomer spring resting against the bearing's sleeve are spaced apart by one or more notches or by at least one annular channel of cylindrical contour running coaxially with the fastening-support axis from the compressing cylinder, and by means of axially shortening at least the load connection fitting.

Decoupling the axial and radial functions in the bearing elastomer body furthermore is supported and enhanced in that the fastening-side end-face of the elastomer block is designed as an annular lip in the form of an umbrella or mushroom top, which opens toward the load side. Always with respect to the radial plane of the rotationally symmetrical integral elastomer spring, the outer conical angle a (FIG. 3) preferably shall be smaller than the inner conical angle β (FIG. 3), whereby the axial thickness of the annular bush is larger radially outward than inward. As a consequence, when the support has been assembled, the axial load on the annular lip will be predominantly radially outward, and the radially inward cylindrical segment of the elastomer spring near the sleeve,—used to radially stabilize the bearing—is practically decoupled in thrust-free manner, that is, it is insulated against vibrations, from the zones of the elastomer spring absorbing the axial compressive forces.

In the process, the thrust-free stress-decoupling of the radial stabilizing segments of the elastomer spring from the zones absorbing the axially directed compressions can be improved further in that an annular recess is present, which radially directly abuts the outer wall of the support sleeve, in the surface of the elastomer spring opposite the load side, and which acts to absorb any deformations occurring for instance in the radial support zone.

In order to control the elastomer spring deformations in the spring zones absorbing the axial stresses, particular or all connection fittings connected in force-transmitting manner with the elastomer spring must be configured in such manner by means of notched edges or shallow hollows to permit for instance curving, to preclude, by their being reversed, the evolution of the stresses. Such a system allows very accurate and fine tuning of the fastening support characteristics.

Preferably annular notches or deeper annular channels, the latter running axially, are formed in the zone of the intersections, located in the radial plane, of the various axial and radial surfaces constituting the seating zone for the cylindrical inner wall of the support connection fitting, in order that, foremost at hookup, the high peak stresses arising in particular in the vicinity of these intersections shall be avoided. Preferably the axial height of the annular channel cut out of the elastomer spring body must be so chosen for the purpose of seating the hookup flange that this height is equal to or only slightly less than the axial height of the hookup aperture.

The invention is elucidated below, together with the conventional state of the art already discussed initially, by means of embodiments and in relation to the drawings.

Figure 3:
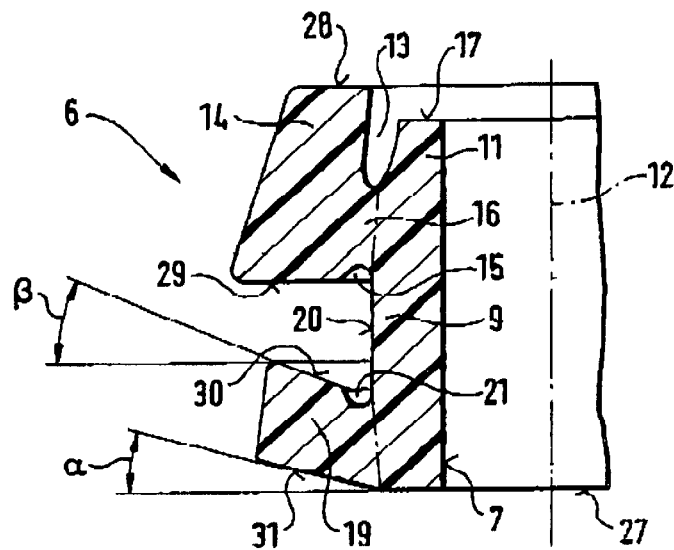
Figure 4:
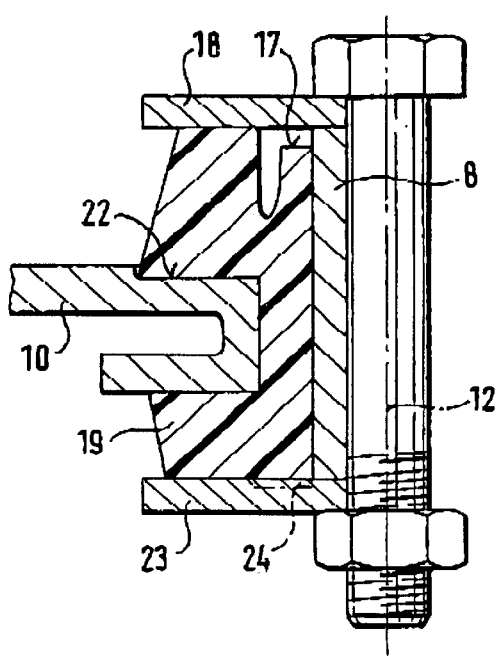
Figure 5:
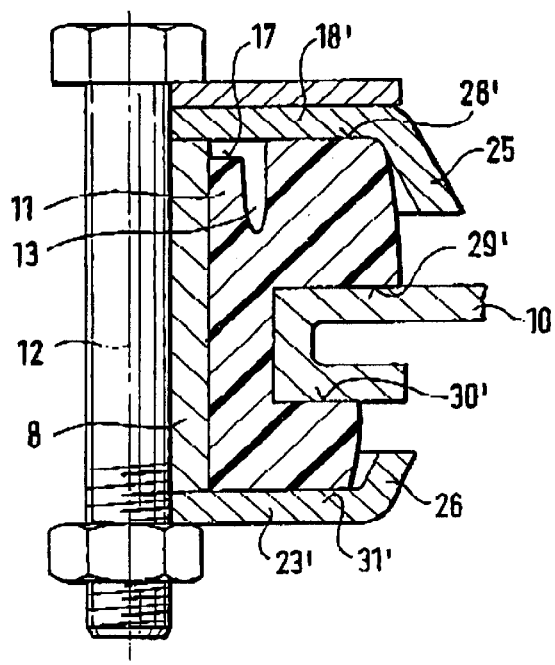

FIG. 1 is a partial sideview and partial axial section of the elastomer spring of a fastening support of the state of the art shown in its relaxed state, FIG. 2 is a sideview partly in axial section of a conventional fastening support as shown in FIG. 1, the support being shown prestressed but unloaded, FIG. 3 is an axial section of an elastomer spring in its relaxed state to be used in a fastening support of the invention, FIG. 4 is an axial section of a first embodiment of a fastening support of the invention fitted with an elastomer spring of FIG. 3, and FIG. 5 is a second embodiment of a fastening support of the invention, also fitted with an elastomer spring of FIG. 3, and also shown in axial section, but in the prestressed, unloaded state.

The fastening support of the state of the art shown in FIGS. 1 and 2 was already briefly discussed above. The drawing of FIGS. 1 and 2 clearly shows that the load F1 is applied over an annular surface of mean radius r1 to the elastomer spring and rests by a force F2 introduced through the support over a circular area of which the mean radius r2 substantially exceeds the force introduction radius r1. This radius differential leads to the initially discussed components of shear and thrust stresses in the elastomer spring, thereby causing the degradation of service life of such fastening supports.

Furthermore FIGS. 1 and 2 clearly show that the radial stabilization of the conventional elastomer spring entails—through the hookup flange 2 and the cylindrical absorbing surface 1.3 of the elastomer spring—transverse stresses in the elastomer block, said stresses directly being transmitted into the axial stress distribution of the loaded fastening support and thereby producing shear components in turn further degrading service life.

These sources of shear and thrust stresses are nearly entirely eliminated in a fastening support of the invention, as a result of which it is feasible to use, in the manner initially discussed, also elastomer materials of lesser strengths.

FIG. 3 is an axial section of an integral, rotationally symmetric elastomer spring 6 in its relaxed state, the way it is used in a fastening support of the invention. The essentially cylindrical elastomer spring comprises a central, axially continuous borehole 7 which receives a bearing sleeve 8 (FIG. 4) which is also cylindrical. A substantially annularly cylindrical segment 9 (FIG. 3) is present around the borehole 7 and is part of the elastomer spring and, in conjunction with the sleeve 8 and a hookup flange 10, usually acting as a support surface, will radially guide the fastening support. This cylindrically annular segment 9 of the elastomer spring 6 is hereafter termed "radial guide" 9 is shown in FIG. 3 in broken lines (merely for unambiguous description, without providing at this textual passage accurately determined physical boundaries).

The segment 11 at the load-surface side of the radial guide 9 is geometrically decoupled by an axially deep annular channel 13 coaxial with the fastening-support axis 12 and by a shallower annular notch 15 from an annular support spring segment 14 of the elastomer spring 6, where this segment 14 absorbs the load and axial compressive stresses, and the segment 11 is connected to this annular support spring segment 14 only through a comparatively weak annular flange 16.

Moreover the segment 11 at the load-surface side of the radial guide 9 is preferably substantially shorter in its axial height in the manner shown in FIGS. 3 through 5 than the annular support spring segment 14 and preferably it will be shorter to such an extent that the circular, annular end face 17 at the load-surface side of this segment 11 shall not touch a load connection fitting 18, 18' (FIGS. 4, 5) resting on the end face of the annular support ring segment 14 even when under operational load.

Accordingly the load is introduced into the elastomer spring 6 and the buildup of the compressive stresses so generated is present exclusively in the portion of the annular support spring segment 14 across its end-face circular surfaces 28, 29 and, as shown in FIGS. 3 and 4, also through the annular surfaces 30, 31 of an annular lip 19. The load being absorbed through the annular surfaces 28, 29 and 30, 31 resp. at least at substantially equal radii, shear stresses that would degrade the service life of the fastening support will not be generated in the bearing elastomer segments 14, 19 of the elastomer spring 6.

Because of this geometrically doubled decoupling, that is both radial and axial, of the radial guide 9 from the compressive-stress segments of the elastomer spring 6, namely from the annular support spring segment 14 and the annular lip 19, shear stresses in the bearing spring can be suppressed to such an extent that the fastening support of the invention offers service life under dynamic steady-state load (measured on a test pulser) which is extended 10 to 20 times compared with the fastening support of the state of the art shown in FIGS. 1 and 2.

At the same time the fastening support of the invention offers substantially improved transverse rigidity, that is improved radial spring guidance, over the state of the art.

As shown in the illustrative embodiment of the invention of FIG. 3, the elastomer spring 6 is fitted on the hookup side with an annular, umbrella-like lip 19 in the form of frusto-conical surface opening toward the support side. This annular lip 19 in particular combines three functions: (i) it centers and guides the elastomer spring during hookup into the hookup aperture of the hookup flange 10; (ii) it affixes and stabilizes the elastomer spring 6 in the hookup aperture due to the hookup flange 10 being peripherally clamping; and (iii) as regards fastening supports of the sort shown in FIGS. 4 and 5 it acts as an annular support ring segment absorbing additional, axially introduced compressive stresses, for instance if the load connection fitting 18, 18' is subjected to tensions illustratively generated by the swings of a motor-vehicle drive unit in case the fastening support is used as a so-called "engine mount".

To allow good centering and hookup of the elastomer spring, the aperture angle a, relative to the support's radial plane, subtended by the outer conical surface of the annular lip 19 when in its relaxed state (FIG. 1), preferably shall be in the approximate range of 10 to 25°. At the same time the aperture angle β, relative also to the support's radial plane, subtended by the inner conical surface of the annular lip 19, when in its relaxed state FIG. 1), preferably shall be within the approximate range of 25 to 40°, provided that the aperture angle α preferably shall always be smaller, in particular smaller by at least 5°, than the aperture angle β. This means that the annular lip 19 is thicker at its outer edge than at its inner edge.

A number of advantages arise from this reinforcement of the outer edge of the annular lip 19. On one hand the hookup behavior of the elastomer spring 6 is improved because the annular lip 19 will not unpredictably deform and stretch during hookup but instead will reliably yield at its slighter inner annular edge. On the other hand an outwardly directed tension component is generated by the widening of the annular lip 19 when gripping the hookup flange and thereby the affixation of the elastomer spring in the hookup flange will be improved. In the third place, when the tensile forces are introduced at the load-connection fitting, the application of the compressive forces to the annular lip 19 takes place almost exclusively (depending on adjustment) in the peripheral edge zone of annular lip 19, implementing thereby the decoupling of the radial guide 9 from the axially directed compressive stresses in the annular lip 19 in a manner free of thrust stresses.

An annular notch 21—which like the annular notch 15 reduces the stresses at the deformation zones near the annular edges—is provided to facilitate hookup of the elastomer spring and is formed along the circular dividing line between the inner conical surface of the annular lip 19 and the outer cylindrical surface 20 of the radial guide 9 of the elastomer spring.

Because of the comparatively strongly lined and creviced structure of the elastomer spring 6 of the fastening support, another "byproduct" offers a significant industrial advantage, namely a sensible shortening of the required time of vulcanization, allowing directly lowering the manufacturing costs of the elastomer spring.

The fastening-support functions geometrically determined by the elastomer spring can be both reinforced as well as fine-tuned in the assembled state of the fastening support in concert with corresponding designs of the steel components of the fastening support.

Illustratively, as shown in the embodiment of FIG. 4, the inner edge zone of the hookup flange 10 is formed as a flat, annular recess 22 of a radius equal to or slightly less than the outside diameter of the foot zone of the annular support segment 14 resting on this recess. This design allows suppressing a curving, rolling motion of the foot zone of the annular support segment 14 on the hookup flange surface in particular when a dynamic steady-state load is applied, where otherwise such a load might cause the elastomer spring to tear in the rolling zone. For that purpose the recess 22 can be manufactured by deep-drawing or by lathing or in any suitable manner. Such annular recesses suppressing rolling motions in the elastomer also can obviously be present at arbitrary other supports of the fastening support.

Similarly, though for other purposes, an annular recess 24 may be provided in the support-side inner edge zone of a tension reversing disk 23. Such a recess is indicated in FIG. 4 by a broken line and acts as an escape space for an axial deformation of the radial guide 9 of the elastomer spring, as a result of which significant thrust stresses are suppressed in this critical zone of bending deformation of the annular lip 19.

The elongated, apron-like edge frames 25, 26 of the support fittings 18', 23' shown in FIG. 5 are used less to suppress roll motions than to control, affect and tune the curvature of the elastomer spring, especially at high compressive loads. The inside diameter of such a notch may be equal to or slightly less than the outside diameter of the annular support spring segment in this zone, as shown in FIG. 5 for the frame 25, but it also may be larger than the outside diameter of the annular support spring segment as shown in FIG. 5 for the frame 26. Whereas the edge frame 25 causes from the beginning of compressive loading of the fastening support, an increasing stiffness in the bearings characteristic line, the edge frame 26 initially permits unaffected compression and curving of the elastomer spring and only above a threshold value of the compressive load will it initiate a progressive characteristic line.

It is in this manner that the fastening support can be tuned within wide limits to a predetermined application range without thereby incurring a tradeoff between the above discussed basic functions of the elastomer spring and the fastening support as a whole. Furthermore the effective mean radii of the force transmitting surfaces 28', 29', 30' and 31' remain unaffected by such matching steps.

What is claimed is:

1. A fastening support, comprising:
   a first connection fitting formed as a connection fitting flange having a hookup aperture;
   a separate single-element elastomer spring press-fitted through the hookup aperture and having an axial through bore; and
   second connection fittings connected to the elastomer spring, to both hookup and support sides of the flange;
   wherein the connection fittings and the elastomer spring define therebetween force-transmitting surfaces which are configured in a mutually coaxial manner and situated on substantially equal radii with respect to the through bore, whereby forces axially introduced from the second connection fittings and from the first connection fitting into the elastomer spring are substantially free of components of thrust stresses, neglecting deformation curving, and free of components of shear stresses, resulting in a spatial compressive stress distribution of annular cylindrical shape in the elastomer spring; and
   wherein the elastomer spring comprises an umbrella-like annular lip at the hookup side and in the form of a frustoconical surface opening toward the support side.

2. The fastening support as claimed in claim 1, wherein an annular notch in form of an axial, resilient channel is formed in a circular intersection of the inside surface of the annular lip with an inner cylindrical surface of the elastomer spring.

3. The fastening support as claimed in claim 1, wherein the annular lip comprises a circular annular surface in the radial plane for connecting an outer surface of the annular lip to a cylindrical inner surface of a central borehole of the elastomer spring at a hookup-side end face of the elastomer spring.

4. A fastening support comprising:
   a single element elastomer spring;
   a first connection fitting formed as a connection fitting flange having a hookup aperture for receiving and linking the elastomer spring which rests on an edge surface zone of the flange; and
   second disk-shaped connection fittings connected to the elastomer spring, to both hookup and support sides of the flange and being fitted with a sleeve crossed by a screw bolt fitted with external nuts;
   wherein
   force-transmitting surfaces are configured in mutually coaxial manner in the direction of force transmission and situated on equal or nearly equal radii between cooperating surface segments of the connection fittings and the elastomer spring, whereby forces axially introduced from the second connection fittings and from the first connection fitting into the elastomer spring are practically free of components of thrust stresses, neglecting deformation curving, and free of components of shear stresses, resulting in a spatial compressive stress distribution of annular cylindrical shape in the elastomer spring;
   the elastomer spring comprises an umbrella-like annular lip at the hookup side and in the form of a frustoconical surface opening toward the support side; and the annular lip has an outer conical angle α relative to the radial plane smaller than an inner conical angle β also relative to the radial plane.

5. A fastening support, comprising:
   a first connection fitting formed as a connection fitting flange having a hookup aperture;
   a separate single-element elastomer spring press-fitted through the hookup aperture and having an axial through bore; and
   second connection fittings connected to the elastomer spring, to both hookup and support sides of the flange;
   wherein the connection fittings and the elastomer spring define therebetween force-transmitting surfaces which are configured in a mutually coaxial manner and situated on substantially equal radii with respect to the through bore, whereby forces axially introduced from the second connection fittings and from the first connection fitting into the elastomer spring are substantially free of components of thrust stresses, neglecting deformation curving, and free of components of shear stresses, resulting in a spatial compressive stress distribution of annular cylindrical shape in the elastomer spring; and
   wherein a bowl-shaped recess is formed on a surface of the flange concentrically enclosing the hookup aperture, a surface of an annular notch of the elastomer spring, which receives the flange, rests on said bowl-shaped recess, and a base diameter of said recess when the fastening support is statically loaded during assembly is equal to or slightly less than an outside diameter of said surface of the annular notch of the elastomer spring.

6. A fastening support, comprising;
   a hookup flange having opposite supported and supporting sides and a hookup aperture communicating the supported and supporting sides;
   a separate single-element elastomer spring press-fitted through the hookup aperture and being in contact with the supported and supporting sides of the hookup flange at first and second force-transmitting surfaces, respectively, the elastomer spring having supported and supporting side end faces and a through bore communicating the supported and supporting side end faces; and
   supported and supporting side connection fittings abutting on the supported and supporting side end faces of the elastomer spring at third and fourth force-transmitting surfaces, respectively;
   wherein at least the first, and third force-transmitting surfaces are disposed coaxially and substantially equally radially with respect to the through bore of the elastomer spring; and
   wherein the hookup flange has a reduced thickness in a region of the first force-transmitting surface and the reduced thickness region of the hookup flange has a radial dimension not in excess of that of the first force-transmitting surface.

7. A press-fit type elastomer spring for use in a fastening support including a hookup flange having opposite supported and supporting sides and a hookup aperture communicating the supported and supporting sides, and supported and supporting side connection fittings, said elastomer spring comprising a single elastomer body comprising:
   an inner cylindrical annular portion having an axial through bore;

a supported side cylindrical annular portion formed contiguous to the inner portion and having first and second force-transmitting surfaces axially spaced; and a supporting side cylindrical annular portion formed contiguous to the inner portion and having third and fourth force-transmitting surfaces axially spaced, the second and third force-transmitting surfaces and an exposed outer wall of the inner section together defining an annular notch separating the supported and supporting side portions;

wherein at least the first, and third force-transmitting surfaces are disposed coaxially and substantially equally radially with respect to the through bore; and wherein the supporting side portion is formed as an umbrella-like annular lip with the third and fourth force-transmitting surfaces being in the form of frustoconical surfaces opening toward the supported side portion.

8. The elastomer spring of claim 7, wherein the third and fourth force-transmitting surfaces are slanted at outer conical angles $\beta$ and $\alpha$ relative plane, respectively, and $\beta > \alpha$.

9. The elastomer spring of claim 7, wherein the inner portion has a supporting side end face formed in a radial plane so as to be contiguous to the fourth force-transmitting surface.

10. A press-fit type elastomer spring for use in a fastening support including a hookup flange having opposite supported and supporting sides and a hookup aperture communicating the supported and supporting sides, and supported and supporting side connection fittings, said elastomer spring comprising a single elastomer body comprising:

an inner cylindrical annular portion having an axial through bore;

a supported side cylindrical annular portion formed contiguous to the inner portion and having first and second force-transmitting surfaces axially spaced; and a supporting side cylindrical annular portion formed contiguous to the inner portion and having third and fourth force-transmitting surfaces axially spaced, the second and third force-transmitting surfaces and an exposed outer wall of the inner section together defining an annular notch separating the supported and supporting side portions;

wherein at least the first, and third force-transmitting surfaces are disposed coaxially and substantially equally radially with respect to the through bore; and the elastomer spring further comprises at least one axial channel formed adjacent to the exposed outer wall of the inner section and extending from one of the second and third force-transmitting surfaces toward the first and fourth force-transmitting surfaces, respectively.

11. A press-fit type elastomer spring for use in a fastening support including a hookup flange having opposite supported and supporting sides, and hookup aperture communicating the supported and supporting sides, and supported and supporting side connection fittings, said elastomer spring comprising a single elastomer body comprising:

an inner cylindrical annular portion having an axial through bore;

a supported side cylindrical annular portion formed contiguous to the inner portion and having first and second force-transmitting surfaces axially spaced; and a supporting side cylindrical annular portion formed contiguous to the inner portion and having third and fourth force-transmitting surfaces axially spaced, the second and third force-transmitting surfaces and an exposed outer wall of the inner section together defining an annular notch separating the supported and supporting side portions;

wherein at least the first, and third force-transmitting surfaces are disposed coaxially and substantially equally radially with respect to the through bore; and wherein the inner portion has a supported side end face axially and radially spaced from the first force-transmitting surface.

12. The elastomer spring of claim 11, further comprising an axial channel separating the supported side end face of the inner portion and the first force-transmitting surface of the supported side portion, said channel having an outer wall formed contiguous to the first force-transmitting surface and an inner wall formed contiguous to the supported side end face, the inner wall being axially shorter than the outer wall.

* * * * *